United States Patent
Chiba et al.

(10) Patent No.: US 9,862,785 B2
(45) Date of Patent: Jan. 9, 2018

(54) METHOD FOR PRODUCING OLEFIN POLYMER

(71) Applicant: JX NIPPON OIL & ENERGY CORPORATION, Tokyo (JP)

(72) Inventors: Tatsuya Chiba, Tokyo (JP); Koichi Sato, Tokyo (JP); Teruhisa Kuroki, Tokyo (JP); Ryuichiro Furusawa, Tokyo (JP); Takeshi Omata, Tokyo (JP)

(73) Assignee: JX NIPPON OIL & ENERGY CORPORATION, Tokyo (JP)

( * ) Notice: Subject to any disclaimer, the term of this patent is extended or adjusted under 35 U.S.C. 154(b) by 0 days.

(21) Appl. No.: 15/126,096

(22) PCT Filed: Feb. 20, 2015

(86) PCT No.: PCT/JP2015/054809
§ 371 (c)(1),
(2) Date: Sep. 14, 2016

(87) PCT Pub. No.: WO2015/141388
PCT Pub. Date: Sep. 24, 2015

(65) Prior Publication Data
US 2017/0107311 A1    Apr. 20, 2017

(30) Foreign Application Priority Data

Mar. 19, 2014   (JP) .................................. 2014-056213

(51) Int. Cl.
*C07C 2/02*  (2006.01)
*C07C 7/00*  (2006.01)
*C10G 17/00* (2006.01)
*C10G 45/00* (2006.01)
*C08F 110/10* (2006.01)

(52) U.S. Cl.
CPC ........ *C08F 110/10* (2013.01); *C08F 2500/03* (2013.01)

(58) Field of Classification Search
CPC .. C08F 8/26; C08F 10/08; C08F 10/10; C08F 4/14; C08F 210/08; C08F 210/10
USPC ........... 585/525, 861, 868; 208/262.1, 262.5, 208/263
See application file for complete search history.

(56) References Cited

U.S. PATENT DOCUMENTS

| 5,504,172 A | 4/1996 | Imuta et al. |
| 6,476,284 B1 * | 11/2002 | Ohashi ...................... C08F 8/26 |
| | | 208/262.1 |
| 2004/0198937 A1 | 10/2004 | Auer et al. |
| 2007/0155930 A1 | 7/2007 | Rath et al. |

FOREIGN PATENT DOCUMENTS

| CN | 1069496 A | 3/1993 |
| CN | 1070655 A | 4/1993 |
| CN | 1377901 A | 11/2002 |
| GB | 852358 A | 10/1960 |
| JP | H07-330830 A | 12/1995 |
| JP | 2001-055408 A | 2/2001 |
| JP | 2001-055415 A | 2/2001 |
| JP | 2004-533525 A | 11/2004 |
| JP | 2007-517098 A | 6/2007 |
| WO | 03/004540 A1 | 1/2003 |
| WO | 2005/066220 A1 | 7/2005 |
| WO | 2008/024824 A1 | 2/2008 |
| WO | 2013/092342 A1 | 6/2013 |

OTHER PUBLICATIONS

International Search Report issued with respect to Application No. PCT/JP2015/054809, dated May 19, 2015.
International Preliminary Report on Patentability issued with respect to Application No. PCT/JP2015/054809, dated Sep. 29, 2016.
Chinese Office Action issued with respect to Application No. 201580012714.7, dated May 4, 2017.

* cited by examiner

*Primary Examiner* — William Cheung
(74) *Attorney, Agent, or Firm* — Greenblum & Bernstein, P.L.C.

(57) ABSTRACT

A method for producing an olefin polymer, in which an olefin compound is polymerized in the presence of a Lewis acid catalyst at a temperature of 0° C. or lower to obtain an olefin polymer, the method comprising a step of feeding a raw material liquid including the olefin compound to a reactor provided with a cooling unit, a step of polymerizing the olefin compound in the reactor to obtain a reaction liquid including the olefin polymer, a deactivation step of adding a deactivator to the reaction liquid taken out from the reactor to deactivate the Lewis acid catalyst, and a step of supplying the reaction liquid after the deactivation step to a cold recovery unit to recover cold from the reaction liquid, wherein the amount of the Lewis acid catalyst is $0.5 \times 10^{-3}$ to $1.0 \times 10^{-1}$ mol % based on the total amount of the olefin compound.

6 Claims, No Drawings

METHOD FOR PRODUCING OLEFIN POLYMER

This application is a National Stage application under 35 USC 371 of PCT International Application No. PCT/JP2015/054809, filed on Feb. 20, 2015, which claims priority to Japan Patent application no. 2014-056213 filed Mar. 19, 2014, all of which are herein incorporated by reference in their entirety.

TECHNICAL FIELD

The present invention relates to a method for producing an olefin polymer.

BACKGROUND ART

Conventionally, there has been the following problem: in a low-temperature polymerization reaction of an olefin compound, cooling energy necessary for cooling of a raw material liquid subjected to the reaction and cooling of the inside of a reactor during the reaction is large. In response to this problem, Patent Literature 1 describes a method for producing an isobutylene-based polymer, characterized in that a raw material liquid to be fed to a reactor is cooled in advance by heat exchange with a reaction liquid discharged.

CITATION LIST

Patent Literature

[Patent Literature 1] Japanese Unexamined Patent Publication No. H7-330830

SUMMARY OF INVENTION

Technical Problem

An object of the present invention is to provide a method for producing an olefin polymer, which can allow cooling energy required for a polymerization reaction to be efficiently recovered and which can obtain an olefin compound that has a narrow molecular weight distribution and that is good in characteristics.

Solution to Problem

One aspect of the present invention relates to a method for producing an olefin polymer, in which an olefin compound is polymerized in the presence of a Lewis acid catalyst at a temperature of 0° C. or lower to obtain an olefin polymer. The production method comprises a feeding step of feeding a raw material liquid including the olefin compound to a reactor provided with a cooling unit, a polymerization step of polymerizing the olefin compound in the reactor to obtain a reaction liquid including the olefin polymer, a deactivation step of adding a deactivator to the reaction liquid taken out from the reactor to deactivate the Lewis acid catalyst, and a cold recovery step of supplying the reaction liquid after the deactivation step to a cold recovery unit to recover cold from the reaction liquid.

In one embodiment, the amount of the Lewis acid catalyst may be $0.5 \times 10^{-3}$ to $1.0 \times 10^{-1}$ mol % based on the total amount of the olefin compound.

In addition, in one embodiment, the Lewis acid catalyst may be an aluminum compound represented by the following formula (1) or (2):

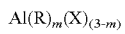

$$Al(R)_m(X)_{(3-m)} \quad (1)$$

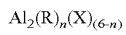

$$Al_2(R)_n(X)_{(6-n)} \quad (2)$$

wherein R represents an alkyl group having 1 to 8 carbon atoms, X represents a halogen atom, m represents 1 or 2, and n represents any integer of 1 to 5.

In addition, in one embodiment, the amount of the Lewis acid catalyst may be $0.5 \times 10^{-3}$ to $0.3 \times 10^{-2}$ mol % based on the total amount of the olefin compound.

In addition, in one embodiment, the raw material liquid to be fed to the reactor may be cooled in advance by the cold recovered in the cold recovery unit.

In addition, in one embodiment, the olefin compound may include isobutene.

In addition, in one embodiment, the deactivator may include water or an alcohol compound.

Advantageous Effects of Invention

The present invention can provide a method for producing an olefin polymer, which can allow cooling energy required for a polymerization reaction to be efficiently recovered and which can obtain an olefin compound that has a narrow molecular weight distribution and that is good in characteristics.

DESCRIPTION OF EMBODIMENTS

A preferred embodiment of the present invention will be described below.

A production method according to the present embodiment is a method for producing an olefin polymer, in which an olefin compound is polymerized in the presence of a Lewis acid catalyst at a temperature of 0° C. or lower to obtain an olefin polymer, the method comprising (1) a feeding step of feeding a raw material liquid including the olefin compound to a reactor provided with a cooling unit, (2) a polymerization step of polymerizing the olefin compound in the reactor to obtain a reaction liquid including the olefin polymer, (3) a deactivation step of adding a deactivator to the reaction liquid taken out from the reactor to deactivate the Lewis acid catalyst, and (4) a cold recovery step of supplying the reaction liquid after the deactivation step to a cold recovery unit to recover cold from the reaction liquid. In addition, in the present embodiment, the amount of the Lewis acid catalyst is $0.5 \times 10^{-3}$ to $1.0 \times 10^{-1}$ mol % based on the total amount of the olefin compound.

In the production method according to the present embodiment, the cold recovery step is performed after the Lewis acid catalyst in the reaction liquid is deactivated. Such a production method can allow cooling energy required for a polymerization reaction to be efficiently recovered, and can provide an olefin compound that has a narrow molecular weight distribution and that is good in characteristics.

Conventionally, when deactivation of the Lewis acid catalyst is performed, cold of the reaction liquid is lost, making recovery of cooling energy by heat exchange or the like difficult. In addition, when the cold recovery step is performed with no deactivation of the Lewis acid catalyst, an unnecessary reaction occur due to a temperature rise of the reaction liquid, sometimes resulting in deterioration in characteristics of the olefin polymer. On the contrary, in the present embodiment, the reaction liquid after the deactivation step is subjected to the cold recovery step, with the Lewis acid catalyst being decreased to a predetermined amount, and therefore cold can be sufficiently recovered from the reaction liquid without deterioration in characteristics of the olefin polymer.

In the present embodiment, it is preferable that the Lewis acid catalyst be an aluminum compound represented by the following formula (1) or (2). In addition, in the present embodiment, it is preferable that the amount of the Lewis acid catalyst be $0.5 \times 10^{-3}$ to $0.3 \times 10^{-2}$ mol % based on the total amount of the olefin compound.

$$Al(R)_m(X)_{(3-m)} \tag{1}$$

$$Al_2(R)_n(X)_{(6-n)} \tag{2}$$

In the formula, R represents an alkyl group having 1 to 8 carbon atoms, X represents a halogen atom, m represents 1 or 2, and n represents any integer of 1 to 5.

In the preferred embodiment, a specified Lewis acid catalyst allows the polymerization reaction of the olefin compound to efficiently progress in a small amount of the catalyst. In addition, the amount of the catalyst within the above suitable range can decrease the amount of a deactivator necessary for deactivation of the catalyst and also minimize generation of heat due to deactivation of the catalyst. Therefore, the loss of cooling energy in the deactivation step is sufficiently suppressed.

Hereinafter, the respective steps of the production method according to the present embodiment will be described in detail.

(1) Feeding Step

In the feeding step, a raw material liquid including an olefin compound is fed to a reactor provided with a cooling unit.

As the olefin compound, for example, an olefin compound having 3 to 10 carbon atoms (more preferably 4 to 6 carbon atoms) can be suitably used.

In addition, examples of the olefin compound include isobutylene, propylene, 1-butene, 2-butene, 2-methyl-1-butene, 2-methyl-2-butene, butadiene, pentene, 4-methyl-1-pentene, isoprene, cyclopentene, cyclopentadiene, hexene, cyclohexane, cyclohexadiene, methyl vinyl ether, ethyl vinyl ether, isobutyl vinyl ether, styrene, α-methyl styrene, dimethylstyrene, monochlorostyrene, dichlorostyrene, β-pinene, indene, vinyltrichlorosilane, vinyldimethylchlorosilane, vinyldimethylmethoxysilane, vinyltrimethylsilane, divinyldichlorosilane, divinyldimethoxysilane, divinyldimethylsilane, 1,3-divinyl 1,1,3,3-tetramethyldisiloxane, trivinylmethylsilane, tetravinylsilane, γ-methacryloyloxypropyltrimethoxysilane and γ-methacryloyloxypropylmethyldimethoxysilane. Among them, in the production method according to the present embodiment, isobutylene, 1-butene, 2-butene or isoprene can be suitably used, and isobutylene is particularly suitable. Herein, the raw material liquid may include one or more of the olefin compounds.

The raw material liquid may further contain a solvent. As the solvent, a known solvent for use in the polymerization reaction of the olefin compound can be used without any particular limitation. The raw material liquid does not necessarily contain the solvent. For example, the solvent can be supplied to the reactor separately from the raw material liquid, or can be supplied to the reactor together with a Lewis acid catalyst described later.

Examples of the solvent include propylene, butane, 1-butene, 2-butene, 2-methyl-1-butene, 2-methyl-2-butene, butadiene, pentene, 4-methyl-1-pentene, isoprene, cyclopentene, cyclopentadiene, hexene, cyclohexene, cyclohexadiene, heptane, heptene, octane, octene, benzene, toluene, xylene, methyl chloride, dichloromethane, chloroform, carbon tetrachloride, ethyl chloride, dichloroethane, trichloroethane, chlorobenzene and dichlorobenzene, and among them, butane, 1-butene, 2-butene, 2-methyl-1-butene, 2-methyl-2-butene, hexane or octane can be suitably used.

While the raw material liquid may be supplied to the reactor at a normal temperature, it is preferable that the raw material liquid be cooled by a raw material liquid cooling unit and then supplied to the reactor. The raw material liquid can be cooled in advance by the raw material liquid cooling unit and then supplied to the reactor to thereby sufficiently suppress deterioration in characteristics of an olefin polymer due to a temperature rise in the reactor, even in the case where the polymerization reaction is performed, for example, in a continuous manner.

The raw material liquid can be, for example, cooled to 5° C. or lower and supplied to the reactor. The temperature of the raw material liquid to be supplied to the reactor is not required to be lower than the reaction temperature of the polymerization reaction, and may be, for example, 10° C. or lower.

As the reactor and the cooling unit with which the reactor is provided, a reactor and a cooling unit known for use in the polymerization reaction of the olefin compound can be used, respectively. For example, when the polymerization reaction is performed in a batch manner, a stirring tank type reactor or the like can be used as the reactor. In addition, when the polymerization reaction is performed in a continuous manner, for example, a tube type reactor or a stirring tank type reactor can be used as the reactor.

In addition, as the cooling unit, for example, a cooling jacket that covers the reactor and a cooling machine that feeds a cooling medium to the cooling jacket can be used. In addition, the cooling unit may be a cooling unit utilizing endotherm and the like due to evaporation of the component present as the raw material or the solvent.

(2) Polymerization Step

The polymerization step is a step of polymerizing the olefin compound in the reactor to obtain a reaction liquid including an olefin polymer.

Polymerization of the olefin compound can be performed in the presence of a Lewis acid catalyst at a reaction temperature of 0° C. or lower. Examples of the Lewis acid catalyst include metallic halides or organometallic halides such as $SnCl_4$, $TiCl_4$, $TiCl_3$, $TiBr_4$, $TiBr_3$, $VCl_5$, $FeCl_3$, $ZrCl_3$, $ZrCl_4$, $ZnBr_2$, $BF_3$, $BCl_3$, $Al(R)_m(X)_{(3-m)}$ and $Al_2(R)_n(X)_{(6-n)}$.

As the Lewis acid catalyst, an aluminum compound represented by the following formula (1) or (2) is preferable.

$$Al(R)_m(X)_{(3-m)} \tag{1}$$

$$Al_2(R)_n(X)_{(6-n)} \tag{2}$$

In the formula, R represents an alkyl group having 1 to 8 carbon atoms, X represents a halogen atom, m represents 1 or 2, and n represents any integer of 1 to 5.

The alkyl group represented by R may be linear or branched. In addition, the number of carbon atoms in the alkyl group is preferably 1 to 4, more preferably 1 or 2.

Examples of the alkyl group represented by R include a methyl group, an ethyl group, a propyl group and a butyl group, and among them, a methyl group or an ethyl group is preferable.

Examples of the halogen atom represented by X include a chlorine atom, a bromine atom and an iodine atom, and among them, a chlorine atom is preferable.

A suitable example of the Lewis acid catalyst include $CH_3AlCl_2$, $(CH_3)_2AlCl$, $C_2H_5AlCl_2$, $(C_2H_5)_2AlCl$, $(CH_3)_3CAlCl_2$, $[(CH_3)_3C]_2AlCl$, $(CH_3)_3Al_2Cl_3$ and $(C_2H_5)_3Al_2Cl_3$. As the Lewis acid catalyst, $C_2H_5AlCl_2$ can be particularly suitably used from the viewpoints of being excellent in safety and allowing the effect of the present invention to be more remarkably exerted.

The amount of the Lewis acid catalyst is $0.5 \times 10^{-3}$ to $1.0 \times 10^{-1}$, preferably $0.5 \times 10^{-3}$ to $1.0 \times 10^{-2}$ mol %, more preferably $0.5 \times 10^{-3}$ to $0.7 \times 10^{-2}$ mol %, further preferably $0.5 \times 10^{-3}$ to $0.3 \times 10^{-2}$ mol % based on the total amount of the olefin compound. If the amount of the Lewis acid catalyst is less than $0.5 \times 10^{-3}$ mol %, the polymerization reaction may not sufficiently progress. If the amount of the Lewis acid catalyst is more than $1.0 \times 10^{-1}$ mol %, a deactivator tends to be largely required and also the loss of cooling energy in deactivation tends to be increased.

The reaction temperature of the polymerization reaction can be appropriately selected according to the type of the olefin compound as a raw material, characteristics of an olefin polymer to be desired, and the like. The reaction temperature can be 10° C. or lower, and is preferably 0° C. or lower in order to obtain a polymer high in the degree of polymerization.

The reaction pressure is not particularly limited, and it can be, for example, 0.1 to 2.0 MPa and is preferably 0.2 to 1.0 MPa.

In the polymerization step, a co-catalyst can also be further used. Examples of the co-catalyst include water and alcohols. The amount of the co-catalyst can be, for example, 5 to 250 mol % and is preferably 10 to 50 mol % based on the total amount of the Lewis acid catalyst.

In the polymerization step, the polymerization reaction of the olefin compound can be performed in a batch manner or performed in a continuous manner. It is preferable that the polymerization reaction be performed in a continuous manner in terms of production efficiency.

(3) Deactivation Step

In the deactivation step, a deactivator is added to the reaction liquid taken out from the reactor to deactivate the Lewis acid catalyst. In the deactivation step in the present embodiment, the amount of the Lewis acid catalyst is small and therefore the amount of the deactivator necessary for deactivation and the amount of reaction heat generated in deactivation can be sufficiently reduced. Thus, in the production method according to the present embodiment, the loss of cooling energy of the reaction liquid, due to deactivation of the Lewis acid catalyst, can be sufficiently suppressed.

The deactivator may be any deactivator as long as it can deactivate the above Lewis acid catalyst. As the deactivator, for example, water, an alcohol compound, ethers, amines, acetonitrile, ammonia, a basic aqueous solution based on mineral, or the like can be used, and among them, water or an alcohol compound can be suitably used. Herein, an alkyl alcohol having 1 to 5 carbon atoms can be suitably used as the alcohol compound, and an alcohol compound selected from methanol, ethanol, isopropyl alcohol, butanol and pentanol is preferable.

The amount of the deactivator may be any amount as long as the Lewis acid catalyst can be deactivated. The amount of the deactivator can be, for example, 50 to 3000 mol % or 100 to 200 mol % relative to the Lewis acid catalyst.

The method of adding the deactivator is not particularly limited. For example, the reaction liquid can be fed to a second reactor and the deactivator can be added into the second reactor to which the reaction liquid is fed, thereby performing deactivation of the Lewis acid catalyst. Alternatively, a deactivator inlet can be disposed in the middle of a transport line where the reaction liquid is transported from the reactor to a cold recovery unit described later, and the deactivator can be loaded through the deactivator inlet to mix the reaction liquid and the deactivator in the transport line, thereby performing deactivation of the Lewis acid catalyst.

The deactivator may also be dissolved or dispersed in a solvent, and added to the reaction liquid. As the solvent that dissolves or disperses the deactivator, for example, propylene, butane, 1-butene, 2-butene, 2-methyl-1-butene, 2-methyl-2-butene, butadiene, pentene, 4-methyl-1-pentene, isoprene, cyclopentene, cyclopentadiene, hexene, cyclohexene, cyclohexadiene, heptane, heptene, octane, octene, benzene, toluene, xylene, methyl chloride, dichloromethane, chloroform, carbon tetrachloride, ethyl chloride, dichloroethane, trichloroethane, chlorobenzene or dichlorobenzene can be used.

(4) Cold Recovery Step

In the cold recovery step, the reaction liquid after the deactivation step is supplied to a cold recovery unit to recover cold from the reaction liquid. In the present embodiment, the Lewis acid catalyst is deactivated in the deactivation step, and therefore deterioration in characteristics of an olefin polymer due to a temperature rise of the reaction liquid by cold recovery is sufficiently suppressed. In addition, the loss of cooling energy of the reaction liquid in the deactivation step is sufficiently suppressed, and therefore cold can be efficiently recovered from the reaction liquid in the cold recovery step.

The cold recovery unit is not particularly limited, and a known cold recovery unit can be adopted. For example, the cold recovery unit may be provided with a heat exchanger. As the heat exchanger, a known heat exchanger such as a double-tube type heat exchanger, a multi-tubular type heat exchanger, a plate type heat exchanger or a countercurrent type heat exchanger can be used.

While the cold recovered by the cold recovery unit may be applied in any manner, it is desirably applied in the production method according to the present embodiment. For example, the cold recovered by the cold recovery unit can be used in order to cool the raw material liquid to be fed to the reactor, in advance, by the cold recovered by the cold recovery unit. The cold recovered by the cold recovery unit can also be used in order to cool the inside of the reactor in combination with the cooling unit with which the reactor is provided.

That is, the cold recovery step may be, for example, a step of performing heat exchange between the reaction liquid and the raw material liquid to be fed to the reactor, to thereby cool the raw material liquid, and the cold recovery unit may be a heat exchanger that performs heat exchange between the reaction liquid and the raw material liquid.

The cold recovery step may also be, for example, a step of performing heat exchange between the reaction liquid and the cooling medium to be supplied to the cooling unit with which the reactor is provided, to thereby cool the cooling medium, and the cold recovery unit here may be a heat exchanger that performs heat exchange between the reaction liquid and the cooling medium.

In the production method according to the present embodiment, an olefin polymer can be obtained from the reaction liquid after the cold recovery step by a known purification method. That is, the production method according to the present embodiment may include a step of obtaining an olefin polymer from the reaction liquid after the cold recovery step.

The purification method is not particularly limited, and for example, the reaction liquid can be distilled to remove the unreacted olefin compound, the solvent and the like, thereby obtaining an olefin polymer.

The olefin polymer obtained by the production method according to the present embodiment is sufficiently suppressed in terms of deterioration in characteristics due to a temperature rise in cold recovery, and tends to be, for example, narrow in molecular weight distribution.

The molecular weight distribution (Mw/Mn, the ratio of the weight average molecular weight (Mw) to the number average molecular weight (Mn)) of the olefin polymer is preferably 3.0 or less, more preferably 2.3 or less. In addition, the Mw/Mn may be 1.5 or more, 1.8 or more.

Herein, the weight average molecular weight and the number average molecular weight of the olefin polymer represent values measured by gel permeation chromatography (GPC).

A preferred embodiment of the present invention is described above, but the present invention is not intended to be limited to the embodiment.

EXAMPLES

Hereinafter, the present invention is more specifically described with reference to Examples, but the present invention is not intended to be limited to Examples.

(Experimental Apparatus)

A 500-ml autoclave was equipped with a cooling jacket to provide a structure where the internal temperature could be maintained at a low temperature by brine circulation to the cooling jacket. In addition, a countercurrent heat exchanger was connected to the outlet of the autoclave to provide a structure where heat exchange between a raw material liquid to be introduced to the autoclave and a reaction liquid taken out from the autoclave could be performed. Furthermore, a deactivator introduction port was disposed at any location from the outlet of the autoclave to the countercurrent heat exchanger.

Example 1

A mixed solution of isobutene and isobutane (content of isobutene: 50% by mass) was used as a raw material liquid, $CH_3CH_2AlCl_2$ (ethylaluminum dichloride) was used as a Lewis acid catalyst, and a 0.5% by mass solution of isopropyl alcohol in hexane was used as a deactivator.

The temperature in the autoclave was set at −15° C., and the raw material liquid was continuously introduced at 600 g/h and also the Lewis acid catalyst was continuously introduced into the autoclave so that the amount was $2.4 \times 10^{-3}$ mol % relative to isobutene, thereby allowing polymerization to continuously progress in the autoclave. Herein, the Lewis acid catalyst was dispersed in hexane and introduced into the autoclave. The deactivator was continuously introduced through the deactivator introduction port to the reaction liquid taken out from the autoclave at a rate (0.6 ml/min) so that the amount of isopropyl alcohol was 15 mol per mol of the Lewis acid catalyst.

The reaction liquid recovered through the heat exchanger was distilled to remove the unreacted isobutene and isobutane, thereby obtaining an olefin polymer.

The molecular weight distribution (the ratio Mw/Mn of the weight average molecular weight to the number average molecular weight) of the resulting olefin polymer was 2.2. In addition, the amount of cold, which could be recovered by the heat exchanger, was 16.9 kJ/h.

Comparative Example 1

The reaction was performed in the same manner as in Example 1 except that the amount of the Lewis acid catalyst was changed to $1.65 \times 10^{-1}$ mol % relative to isobutene and the amount of the deactivator was changed to 41 ml/min (rate so that the amount of isopropyl alcohol was 15 mol per mol of the Lewis acid catalyst), to thereby obtain an olefin polymer.

The molecular weight distribution (the ratio Mw/Mn of the weight average molecular weight to the number average molecular weight) of the resulting olefin polymer was 2.2. In addition, the amount of cold, which could be recovered by the heat exchanger, was 5.1 kJ/h.

Comparative Example 2

The reaction was performed in the same manner as in Example 1 except that the amount of the Lewis acid catalyst was changed to $1.65 \times 10^{-1}$ mol % relative to isobutene, a 5.0% by mass solution of isopropyl alcohol in hexane was used as the deactivator and the amount of the deactivator was changed to 4.1 ml/min (rate so that the amount of isopropyl alcohol was 15 mol per mol of the Lewis acid catalyst), to thereby obtain an olefin polymer.

The molecular weight distribution (the ratio Mw/Mn of the weight average molecular weight to the number average molecular weight) of the resulting olefin polymer was 2.2. In addition, the amount of cold, which could be recovered by the heat exchanger, was 13.5 kJ/h.

Comparative Example 3

The reaction was performed in the same manner as in Example 1 except that the deactivator was not introduced through the deactivator introduction port. The deactivator was added to the reaction liquid recovered through the heat exchanger, and the unreacted isobutene and isobutane were removed by a distillation operation, to thereby obtain an olefin polymer.

The molecular weight distribution (the ratio Mw/Mn of the weight average molecular weight to the number average molecular weight) of the resulting olefin polymer was 3.4.

The invention claimed is:

1. A method for producing an olefin polymer, in which an olefin compound is polymerized in the presence of a Lewis acid catalyst at a temperature of 0° C. or lower to obtain an olefin polymer, the method comprising:
   a feeding step of feeding a raw material liquid including the olefin compound to a reactor provided with a cooling unit;
   a polymerization step of polymerizing the olefin compound in the reactor to obtain a reaction liquid including the olefin polymer;
   a deactivation step of adding a deactivator to the reaction liquid taken out from the reactor to deactivate the Lewis acid catalyst; and
   a cold recovery step of supplying the reaction liquid after the deactivation step to a cold recovery unit to recover cold from the reaction liquid,
wherein an amount of the Lewis acid catalyst is $0.5 \times 10^{-3}$ to $1.0 \times 10^{-1}$ mol % based on a total amount of the olefin compound.

2. The method according to claim 1, wherein the Lewis acid catalyst is an aluminum compound represented by the following formula (1) or (2):

$$Al(R)_m(X)_{(3-m)} \quad (1)$$

$$Al_2(R)_n(X)_{(6-m)} \quad (2)$$

wherein R represents an alkyl group having 1 to 8 carbon atoms, X represents a halogen atom, m represents 1 or 2, and n represents any integer of 1 to 5.

3. The method according to claim 1, wherein the amount of the Lewis acid catalyst is $0.5 \times 10^{-3}$ to $0.3 \times 10^{-2}$ mol % based on the total amount of the olefin compound.

4. The method according to claim 1, wherein the raw material liquid to be fed to the reactor is cooled in advance by the cold recovered in the cold recovery unit.

5. The method according to claim 1, wherein the olefin compound includes isobutene.

6. The method according to claim 1, wherein the deactivator includes water or an alcohol compound.

* * * * *